Sept. 14, 1943. R. RUMMLER 2,329,220
SAILING AND SAILING GEAR
Filed July 12, 1939 11 Sheets-Sheet 7

INVENTOR:
Rudow Rummler

Sept. 14, 1943.  R. RUMMLER  2,329,220
SAILING AND SAILING GEAR
Filed July 12, 1939   11 Sheets-Sheet 9

INVENTOR:
Rudow Rummler

UNITED STATES PATENT OFFICE 2,329,220

SAILING AND SAILING GEAR

Rudow Rummler, Chicago, Ill., assignor of one-fourth to Burke Rummler, one-fourth to Jack Rummler, one-fourth to Rudow Rummler, Jr., and one-fourth to Wynfield Rummler, all of Cayucos, Calif.

Application July 12, 1939, Serial No. 283,955

3 Claims. (Cl. 114—39)

The discoveries and inventions herein disclosed relate to a method of transportation on the surface of water and include principles of action and structural details for use in the art of sailing. This application for patent supplements an application for patent by Rudow Rummler on Rigging, Serial No. 1722, filed January 14, 1935, now Patent No. 2,170,914, issued August 29, 1939. The present application for patent claims improvements, in the art of sailing, partly disclosed in the parent application, and claims features of construction not disclosed in the parent application.

Revision of the customary sailing methods and structures as here presented is made to combine with the usual methods and structures now in use, a mode of operation discerned in the windward work of soaring birds.

Because of the extended scope of the subject and for understanding of the meaning of the proposed departures from normal sailing methods and construction, conclusions as to soaring birds are mentioned; and these are, that a bird tacks with a negative angle of incidence and that the tacking is dependent upon a balanced relationship between weight of the bird, the form, action and area of the supporting surfaces, and wind velocity. Such tacking may be horizontal or partly vertical or a combination of both, but in all cases gravity and the inertia of weight and momentum is utilized for continuous work into the wind or for gain on a change of tack. In flying, aside from propulsion due to sinusoidal motion of a partly flexible hinged structure, the down stroke of a bird's wing is apparently effective because of a slight negative incidence with reference to the longitudinal center line of the bird.

A rig based upon the wing actions mentioned may be contrasted with winged soaring machines as heretofore constructed, by recognition that the positive angle of incidence provided for in the customary rigid wing structure would be fatal to successful windward work with the present set-up. The sustaining wing as now used assumes a negative incidence, and a lateral tilting thereof and a change of course of a few degrees from directly into the wind is essential for utilizing the reaction of lift for causing the structure to plane to windward. In that respect bird soaring is simulated but the discoveries as now used in practical application have a broad distinction over the unchangeable wing loading of soaring birds, in that with this sailing vessel the wing loading automaticaly increases, as it should, upon increase in wind velocity. The air support and water support vary inversely according to increase in wind velocity. The stronger the wind becomes the more load of the vessel's weight is placed upon the wing, and less of its load placed upon the water. A supporting wing at negative incidence receives a forward thrust by the pull of gravity.

When a breeze is light, under nearly calm conditions, to attain the maximum forward thrust in sailing, it is essential that the largest possible sail area should set vertical; that is, no energy should be lost by either lift or depression, and if there is a slight tendency for the boat to lean under such conditions, it should be compensated for by restoring the sail surface to a vertical position. The latter may be done in case of the improved construction because of the mechanical set-up of the rig. The improved rig, therefore, does not necessarily entail a departure from methods of sailing commonly made use of with fore-and-aft rigs. The sail may be operated in more strict accordance with the fore-and-aft principle of vertical sail setting than the heretofore standard arrangement of sails. When the boat leans, the sail need not lean with it.

The improvement, however, is a decisive departure from standard fore and aft rigs with reference particularly to the method of performing windward work. The standard fore-and-aft rig leaning 45° or more, in a fresh wind, loses a large part of the available power because of loss of efficiency of the keel, and because the vessel is pressed down. With the new rig the lost power may be put to work in various ways, either to save the full forward driving force of the wind or to utilize by lift that component of the power which normally forces the vessel down. The normal downward thrust is converted into an upward thrust, thus decreasing displacement and allowing more speed for that reason, and also bringing into effective operation the action of gravity for a forward glide. When a lifting thrust is added to the horizontal thrust, the sum of the two provides a resultant enabling a boat to point with speed about twice as near to the wind as it could without making use of gravity. To do that kind of work requires a balanced relationship between wind velocity, weight and sail area.

The invention has a class distinction over the art of sailing as customarily practiced in that the discoveries include a method of inclined plane sailing with lift on all courses or for use with engine power to attain high speed. In sailing or soaring commensurate weight is essential for delivery of the received power into a forward gliding thrust. The class definition may be expressed as improvements in soaring methods and as the combination of soaring and sailing with coordinated structural arrangements whereby the static pressure of air is made use of either for, both lifting and forward propulsion into rarified air caused by velocity of flow over the wing structure or for effecting propulsion by the customary method of sailing with the wing in a more-or-less vertical position.

With rig herein disclosed, the sails may cooperate with engine power by serving to reduce displacement and hence proportionately decrease consumption of power in wave making and skin friction.

Assuming that the force that does the major work in sailing is the static pressure of air in back of the sail, then the rate of air flow or relative velocity is the value of energy which may be used to render such pressure effective by reducing static pressure in advance of the sail. The total driving force is, of course, the static pressure plus the velocity pressure in back of the sail. The reduction of static pressure in advance of the sail is brought about by obstructing the normal air flow to deflect part of the flow around the obstruction into a region where the static pressure may be dropped by increase in velocity.

A general aim of the invention is to attain unusual speeds in powered floating structures and further an object of the invention is to effect an increase in the efficiency and speed of sailing vessels with or without engine power.

It is also a purpose of the invention to produce a sailing rig and an improved sailing method with the retention of all the normal usefulness of well-known fore-and-aft sailing methods and rigs, and to combine therewith features and advantages of ships—square-rigged.

A further purpose of the invention is to enhance the ease of control and maneuverability of sailing vessels wherein desirable characteristics of both fore-and-aft rigs and square rigs may be combined and undesirable characteristics of both eliminated.

A further purpose of the invention is to utilize the feature found in soaring birds, whereby angularly related sustaining surfaces permit of tacking with such use of these surfaces that as the effectiveness of part of the sustaining surface is decreased on a change of direction, another part thereof comes into action for forward driving. By such means all the driving force is not lost for an undue time upon a change of tack.

A further purpose of the invention is to provide automatic means for changing the curvature of air foiling of a sail correctly according to wind velocity and change in position from the close hauled to free. Upon tacking operations the leech of the sail is held stretched when close hauled and when the sail moves over to a more neutral horizontal position the sail is allowed to assume a more funnel shape so that one side of its inner surface retains its efficiency the maximum time.

A further purpose of the invention is to provide a lateral tilting mechanism for a sail in combination with automatic means for producing a coincident negative angling of the sail fore-and-aft.

A further purpose of the invention is, upon tacking, to automatically effect a fore-and-aft leveling and dip of the sail and a partial rotation of the sail in its plane when the sail is tilted or rotated laterally by a sheet. In this connection, it is a purpose of the invention to render such leveling and dip automatically variable as required in windward work and absent or reduced upon wearing ship.

Another purpose of the invention is to provide a differential winding drum unit particularly fitted for operating the sheets of this rig.

Another object is the provision of a T bearing or equivalent for a yard, with the shank of the T having a diagonal set for the purpose of limiting motion of the yard to within a fixed oblique plane.

There are numerous other objects, some of which may be worthy of mention, such as structural arrangements and extended applications of machine design for simplicity and elimination of non-essentials in ships' rigs. For instance, the rig renders practical a mast construction of unusual simplicity and strength with reference to its weight. It is a spider construction normally in repose and not under strain except when the vessel is under way; that is, no pole-like structure is required to be under a buckling compression from tensioned shrouds and stays. Numerous customary rigging elements become wholly unnecessary; and a racing craft may be rigged for seaworthiness and have its stability added to by reaction from the wind.

The resulting construction affords economy in transportation. Power waste is avoided by moving the vehicle through a light medium and driving with traction in a dense medium.

Due to the unusual lifting strains to which this rig is sometimes subjected, sailcloth and rigging are heavier or stronger than usual in boats of the same size.

With reference to the drawings, all parts of the construction are coordinated for the single end in view of maintaining any predetermined negative incidence of the sails in all adjustments thereof around fixed axes at the mastheads and allow for limited variation of the incidence as may be favorable for any change in course. The control means is also arranged for giving the sails a set of positive incidence which is used for decreasing displacement only when the craft is under motor power.

Figure 1:
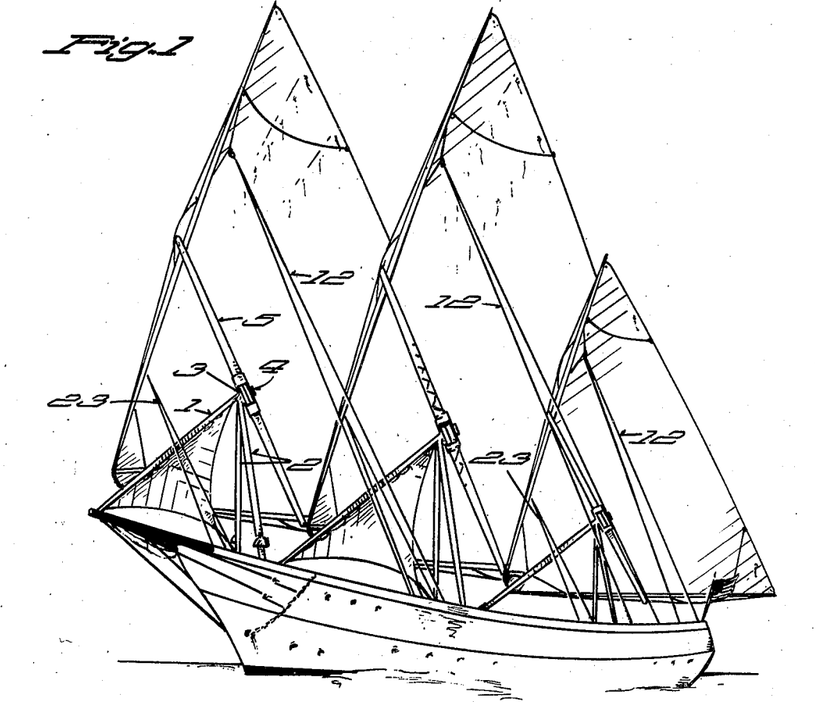
Figure 1 is a perspective view of a heavy, slow-going schooner-rigged vessel bringing out the relationship of the main structural features of the rig.

Figure 1 shows tripod masts formed of a forwardly extending strut 1 and a pair of laterally and rearwardly extending struts 2. The struts are connected at their upper ends by a masthead arrangement 3 with a diagonal trunnion or bearing element 4 for a yard 5.

Figures 5, 6, 7, 8:
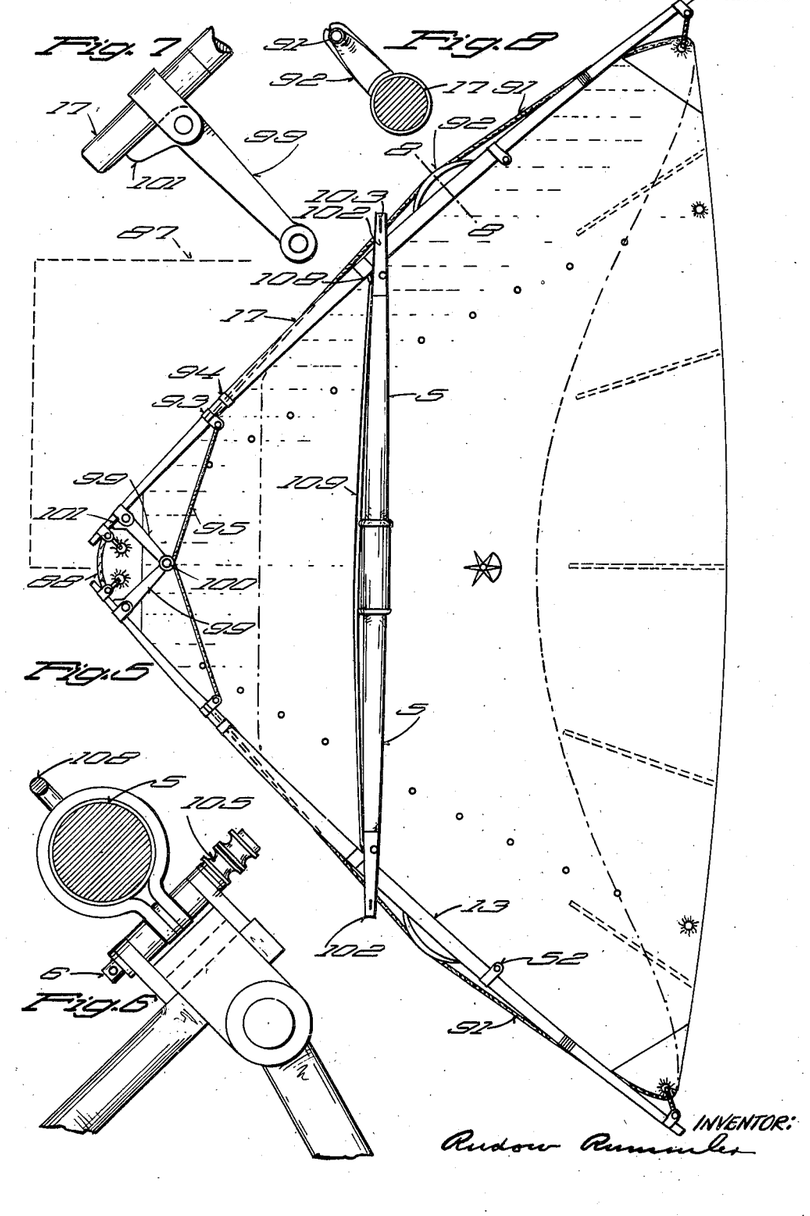
Fig. 5 is a bottom plan view of a sail and its supporting spars.
Fig. 6 is a fragmentary detail of a masthead showing the yard in section.
Fig. 7 is a detail of sail airfoiling linkage forming a pivot connection between the forward ends of port and starboard booms.
Fig. 8 is a sectional detail taken on the line 8—8 of Fig. 5.
Figures 9, 10, 11:
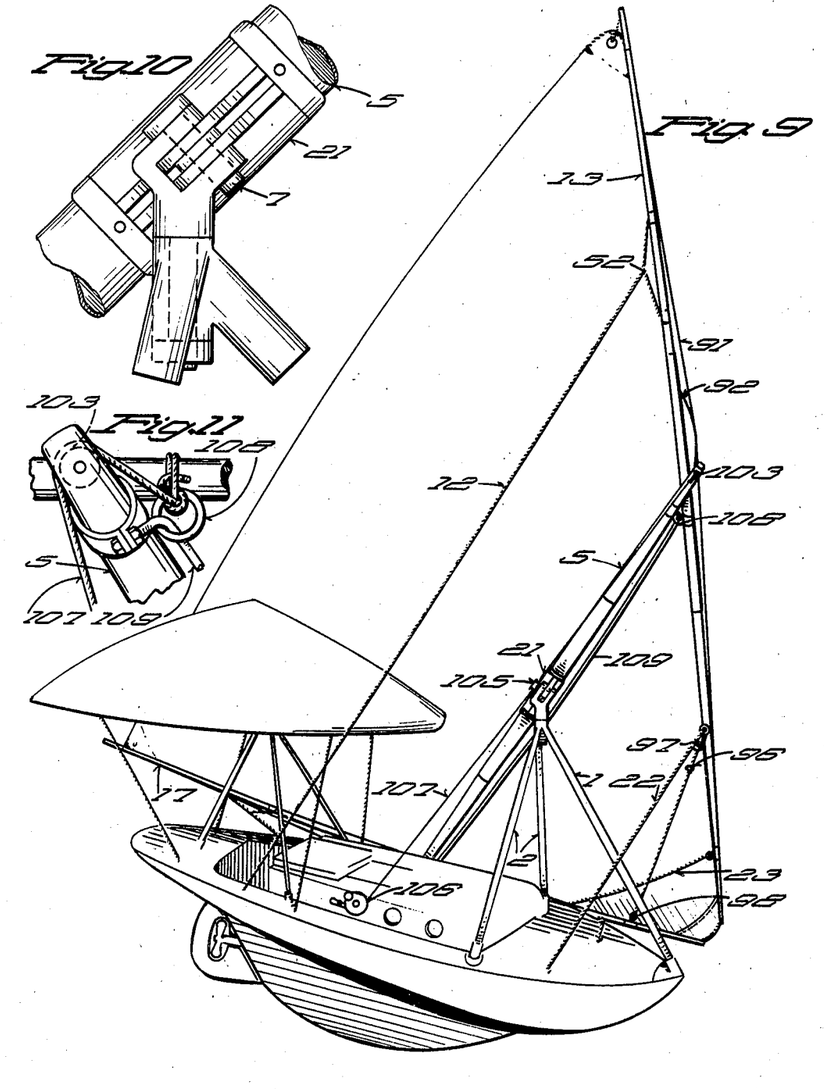
Fig. 9 is a perspective view of a ketch or yawl rig.
Fig. 10 is a fragmentary detail of the yard bearing and masthead construction used in Fig. 9.
Fig. 11 is a fragmentary perspective view of a halyard sheave end of a yardarm.

Masthead arrangements are illustrated by Figures 6 and 10 wherein yards are shown mounted on shafts 6 and 7, the axes of which are parallel with the forwardly extending strut. The yard in this manner may be confined to swing in an oblique plane athwart the vessel.

The plane of movement of the yard is inclined upwardly and forwardly 45°. By movement of the yard in that plane, a sail 8 carried thereby may move from a vertical position on either side of the vessel as indicated by the broken lines 8', Fig. 19, to the horizontal setting indicated by the full lines 8. In this figure, the sail is not strictly horizontal but has a few degrees negative incidence with reference to a fore-and-aft center line of a hull. This negative incidence, with the forward end 9 of the sail closer to the deck line represented by the dot and dash line 10, than the leech end 11 of the sail, is maintained throughout the entire movement of the sail around the diagonal journal of the yard. The degree of incidence increases according to the freedom given the sheet 12.

Figures 17, 18:
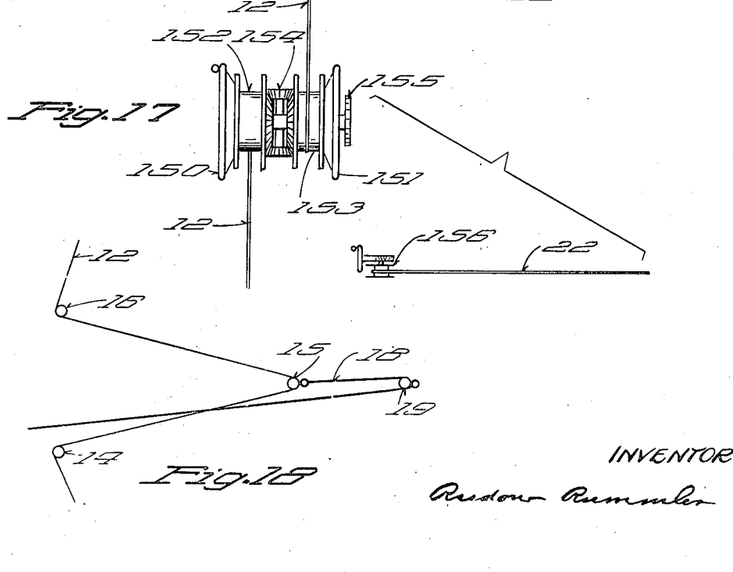
Fig. 17 is a diagram showing in plan a differential gear control means for a sheet and a winch for forward checklines.
Fig. 18 is a diagram, in plan, of sheet-control tackle for a small boat.
Figures 19, 20, 21, 22:
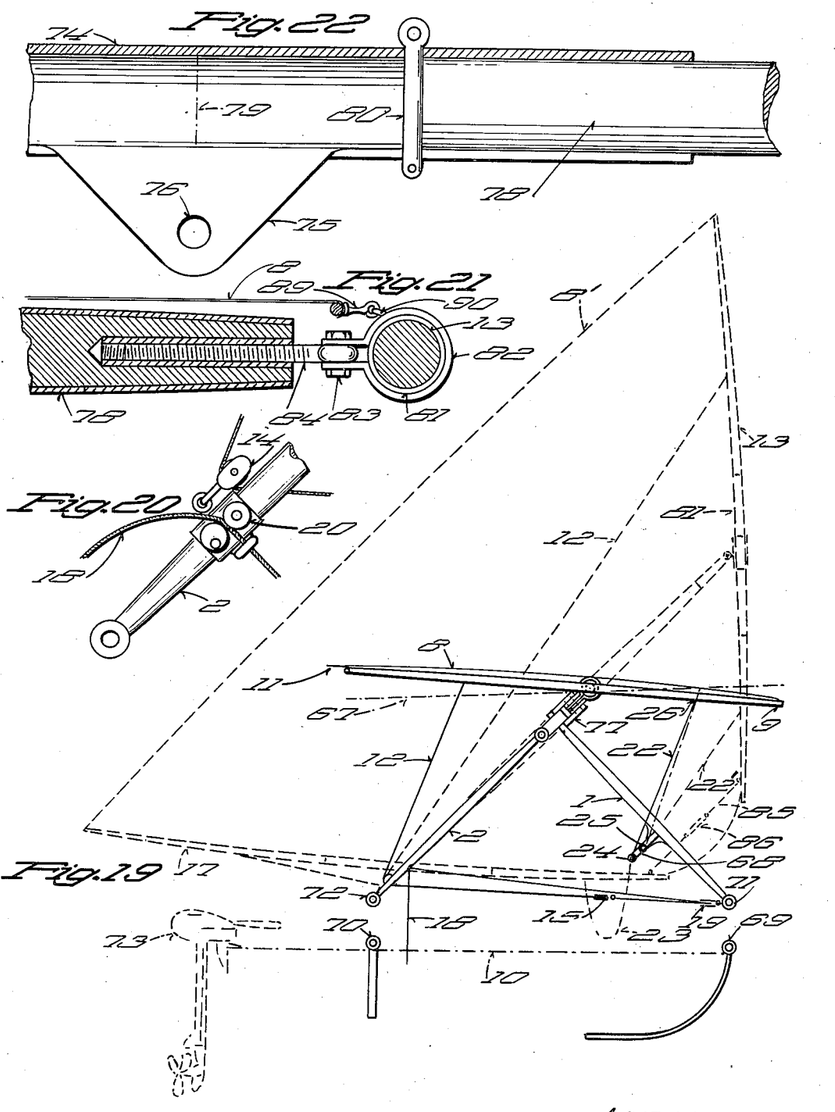
Fig. 19 illustrates in side elevation a small boat with the sheet arrangement shown by Fig. 18.
Fig. 20 is a fragmentary view of the lower end of one of the mast struts of Fig. 19 and shows a cleat for the sheet tackle.
Fig. 21 is a sectional detail of one of the ends of the yard shown in Fig. 19.
Fig. 22 is a sectional detail of the center bearing element of the yard shown in Fig. 19 and arranged for permitting inward movement of the yardarms for reefing purposes.

The principle of the sheet arrangement is illustrated by Fig. 18 in which case the sheet 12, a single line, extends from a starboard boom 13 through three blocks 14, 15 and 16, attached to the hull or mast, to a port boom 17, Fig. 19. The blocks 14 and 16 may be anchored to the lower ends of struts 2 as shown in Fig. 20. By pulling inwardly on the sheet at one side, the sheet pays out an equal extent on the opposite side, and the sail is swung more or less around the masthead between its vertical settings on opposite sides of the boat. The block 15 is held stationary by tackle 18. The tackle 18 passes around a block 19 anchored at the base of forward strut 1 and from there to a cleat 20, Fig. 19. By pulling rearwardly on the tackle, block 15 is run forward; hence both booms 13 and 17 are swung in at their after ends or down toward the deck.

The yard is free to turn in its bearing 21, Fig. 10, or the booms are free to turn on their connection with the yard, Fig. 21.

Forward checklines 22 and 23 are attached to the booms about midway between the yard and forward end of the booms and extend down to attachment points at the deck or, as in Fig. 19, attachment points 24 at the ends of a crosstree or whisker boom 25 carried by strut 1. These control lines determine the minimum negative incidence of the sail and rarely need adjustment. One of these attachment points 24 and the attachment point 26 on the boom, are equidistant whether the sail is horizontal or vertical, Fig. 19.

When a sail is swung from horizontal to vertical, one of the checklines is under tension and compels the boom that is moving up to assume a vertical position. The line 22, when shifted to the 22' position, is under tension, holding the boom vertically and over to weather. The vertical boom is also held to weather by the sheet 12 which is attached thereto between the outer end of the boom and the yard.

Figure 24:
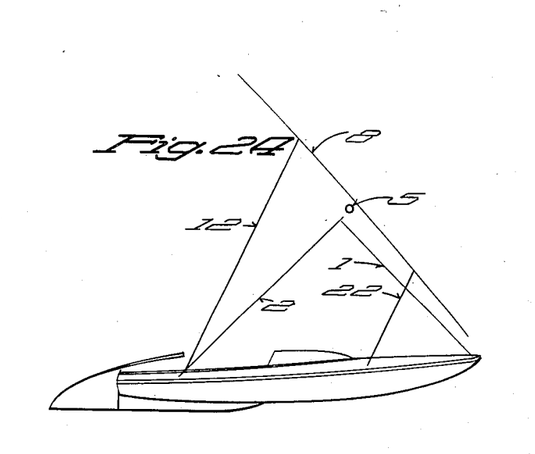
Fig. 24 is a side view in diagram of a small sailing boat showing the sail set for running before the wind.
Figures 25, 26:
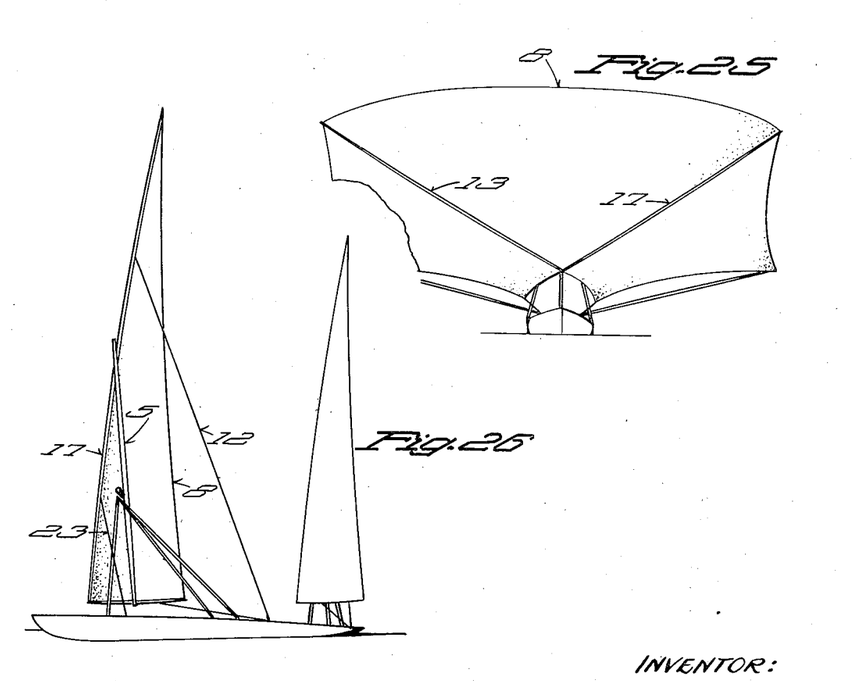
Fig. 25 is a diagrammatic front view of a sailing boat running before the wind, with two spinnaker-like sails added.
Fig. 26 is a diagram in side elevation illustrating a wing-and-wing sail setting of a yawl.

While the minimum negative angle to which the sail may be drawn by sheet 12 is determined by checklines 22 and 23, the maximum negative angle is determined by how much sheet 12 is paid out. The center of area of the sail is rearward of the mast, therefore the sail tends to swing upwardly and outwardly at its rear end and checklines 22 and 23 become slack when the sheet is paid out to permit the craft to run before the wind as illustrated by Fig. 24. The forward apex of the sail is then moved down toward the bow. But if the craft runs before the wind with a vertical setting of the sail, as indicated by Fig. 26, checkline 23 is taut, holding the port boom 17 over to windward.

Figure 12:
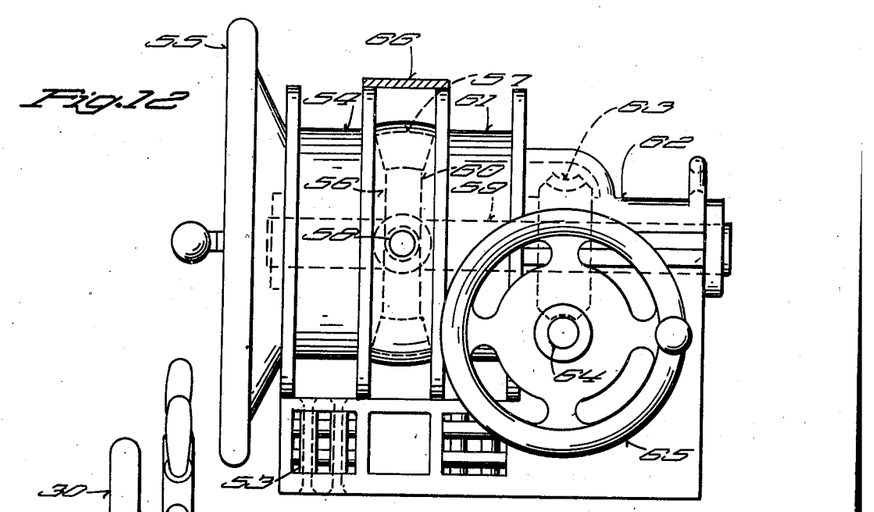
Figs. 12 and 13 are side views partly in section of sheet-winding drum units.

Operating means for a single run sheet is illustrated by Fig. 12.

In Fig. 1 the checklines 23 and sheets 12 are shown as passing from the deck through blocks on the booms and back to the deck to permit the lines to take a greater strain than possible with a single length.

Figure 13:
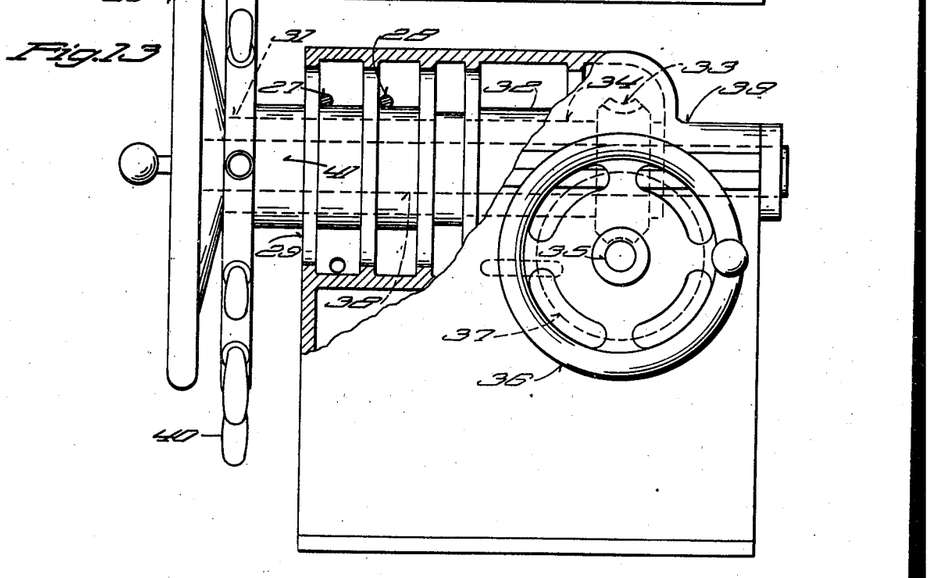

With the sheet arrangement shown in Fig. 1, the ends of the line are anchored to a double drum arrangement, Fig. 13, one end of the line at 27 and the other end at 28. On the double drum unit 29 the lines follow around the drum in opposite directions so that by turning the drum, the sheet will pay out on one side and be wound upon the opposite side.

These drums are rigid with a wheel 30 on hollow shaft 31. The strains on opposite ends of the sheet are generally equal, hence the sail may be swung over with ease and tends to remain where set. Midway of its length, the sheet is anchored to a winding drum 32 the function of which is to draw in simultaneously on both leads of the sheet and thus operate against wind power due to the major area of the sail being rearward of the mast and the necessity of drawing this portion of the sail down or in against the wind. Drum 32, therefore, is shown as carrying a worm wheel 33 to which it is connected through hollow shaft 34.

A transverse worm shaft 35 is provided with an operating wheel 36 so that drum 32 may be manually rotated. The worm shaft also carries the armature of a motor 37 to enable the use of electric power for driving drum 32. The winding drums rotate around a fixed shaft 38 supported in a frame structure 39. This frame structure also is provided with finished bearing surfaces for engaging the flanges of the drums.

A ship's wheel 40 with a steering drum 41 is rotatably mounted upon the hollow shaft 31. The unit shown in Fig. 13 provides convenient one-man control of a sail by the helmsman.

Figures 2, 3, 4:
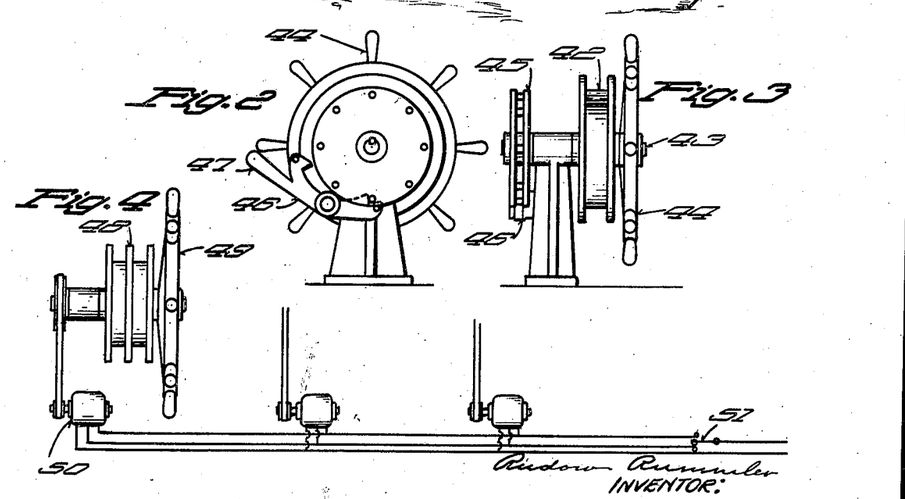
Figs. 2 and 3 are respectively front and side views of a winding drum for sheets, the function of which drum is to draw a sail or sails downwardly or inwardly against the wind or to control the paying out of the sheets.
Fig. 4 is a side view of a winding drum which operates the sheets to control the lateral tilting of the sails.

The single drum 32 for taking two leads of the sheet and hauling the sail in against the wind is repeated at 42, Fig. 3. This drum is fast on a shaft 43 to which is also secured the operating wheel 44 for the drum.

A lantern wheel or pinwheel 45 is keyed to the opposite end of shaft 43. This wheel serves as a ratchet to prevent unwinding of a sheet and for that purpose coacts with a double escapement pawl 46. In winding up the sheet, opposite ends of the pawl are alternately cammed away from the pins. The pawl has a handle 47 whereby it may be oscillated to permit the sheet to unwind step by step and let the sail lift or swing outwardly by the wind.

In connection with drum 42 a double drum 48 Fig. 4, is used for paying out and taking in opposite leads of the sheet. This drum is manually operated by wheel 49 and power operated by motor 50. Motor 50 is reversible under the control of switch 51, and to illustrate how a plurality of sails, such as in Fig. 1, may be brought over in unison from tack to tack, a plurality of motors is shown in Fig. 4.

Fig. 12 shows a winding unit suitable for sheets that do not double back around blocks on the booms. A sheet leads from an attachment point 52 on the starboard boom 13, Figs. 5 and 9, through fair leaders 53, Fig. 12, to an anchoring point on the winding drum 54. A wheel 55 rigid with this drum, if turned to the right, winds up to draw the starboard boom 13 down to the right and swing the sail over. Drum 54 carries a beveled ring gear 56 forming part of differential gearing. The planet pinions 57 rotate on spider arms 58 rigid with shaft 59 and mesh with another ring gear 60 fast to another winding drum 61 which with drum 54 is loose on the shaft. The sheet leading to the port boom is anchored to drum 61. Drums 54 and 61 under the control of wheel 55 rotate in opposite directions. Hence, when one sheet is wound, the other is paid out.

To rotate both drums in the same direction and take in on both sheets shaft 59 is rotated to carry the differential gearing around without relative rotation between the drums, unless wheel 55 is at the same time rotated for that purpose.

Shaft 59 has a bearing at 62 and carries fast a worm wheel 63. Worm shaft 64 is operated by wheel 65. The worm gearing normally holds the spider 58 stationary and this provides the fulcrum for transmitting opposite rotation from drum 54 to drum 61.

The strain on the sheets is about equal on both sides and there is not much likelihood of wheel 55 moving away from the position where it is released. However, a strap brake serves to retain the drums in set position and is useful for example after the wind has gone down and the sea is still running. Fore and aft oscillation of the sail is prevented by taking up on check lines 22 and 23, Fig. 17. In that manner slack is taken out of the sheets and the sail is held rigid with the hull.

Referring to Fig. 19, the checklines 22 and 23, having the function of determining the minimum negative incidence of the sail, may also be so connected as to regulate the maximum positive incidence of the sail. Dot and dash line 67 represents a plane in which the sail may set when at positive incidence. To allow for such setting of the sail, the point of connection of the checklines is changed; for example, from attachment point 24 to attachment point 68.

Such an alteration in the checkline hook-up is made when changing from operation under sail to operation under power. The checklines may lead to worm gear operated winding mechanism as shown by Fig. 17 in such cases, where the control of the checklines is desired, from the cockpit or helmsman's position.

In Fig. 19 the rigging is shown separated from the hull, represented by the line 10. To apply the rig shown in this figure to a hull, the hull is equipped with attachment means such as an eye 69 in the bow and a pair of eyes 70 at the sides or in the stern sheets. The mast struts 1 and 2 have eyes 71 and 72 at their lower ends whereby the mast may be bolted or lashed to the eyes on the hull. The mast may be let go without sawing it off or raising it out of a step.

Fig. 19 also indicates by broken lines an outboard motor 73 attached to the hull. One of the purposes of the illustration is to show the adaptability of the rig, either for sailing or for cooperation with mechanical propulsion means. In the latter case, the sail sets with a positive incidence as indicated by the line 67 and has the function of partly supporting the driven craft in air while the driving means therefor has traction in the water.

The particular yard construction indicated by Fig. 19 is detailed by Figs. 21 and 22. At its center the yard is reinforced by a tubular metal housing 74 having a pair of laterally extending ears 75. Ears 75 are apertured at 76 for the reception of a bearing element by which the yard is attached to the masthead. For this purpose the masthead has a U-shaped support 77. Yardarms 78 fit within the housing 74 and may come together at line 79 when stop pins 80 are removed from the housing. This arrangement is made for the purpose of allowing contraction or reefing of the sail.

Booms 13 and 17 have central tubular reinforcements 81. Surrounding these reinforcements are clevises 82, Fig. 21, which have pivot connections 83 with eye bolts 84 threaded into the end of the yardarm. By turning the yardarms the booms may be shifted outwardly or inwardly for fine regulation of the set of the sail. The inner ends of the booms are connected by cable 85 including turnbuckle 86 whereby the sail may be given fullness at the luff and flattened down at the leech.

The sail may be manufactured flat without allowance for curvature by broad seaming or other irregular operations. The strips of sailcloth are sewn together, edge to edge, into rectangular formation, and lengths are cut therefrom according to the measurement of the sail from luff to leech; that is, measuring from the forward apex to the middle of the leech, with allowance for a roach on each side, and for hemming or reinforcing along the leech. Corners are cut from these straight strips, as indicated by the dotted lines 87, Fig. 5, and these cut corners are used to form the outer clew corners of the finished sail, which is substantially a right triangle in plan. The star-like insignia represents center of area. The dot and dash lines in Fig. 5 outline a storm sail fitting the same spars.

The sail is outwardly roached on all three sides and provided with a bolt rope 88 sewn along the luff or boom edges of the sail. The bolt rope may be provided with snap hooks 89, as indicated in Fig. 21, for engagement with a series of rings 90 seized to the booms. The booms curve from end to end according to the roach of the sail edge attached thereto.

The booms are centrally reinforced by metallic tubes and are also tipped with metal ferrules at their ends. The greatest breaking strain on the booms is at a central point about where the booms pass over the ends of yard 5 (Fig. 5). The booms are, therefore reinforced with cable stays 91 which pass over saddles 92 carried by the booms and extending outwardly and upwardly therefrom at about 45°. With this arrangement a cable 91 breaks at the time breakage of the spars occurs under an excessive load of the character designed for. Cables 91 are shown leading to clevises 93 either clamped fast to the booms or slidable for a limited motion until stopped by collars 94. The clevises 93 are connected by cable 95.

The normal bending strains on the booms, which are inward and downward because of reactance of sheets and check lines, are thus transmitted through cable 95 between the forward ends of the booms. This action provides for flattening the leech of the sail commensurate with the value of forces perpendicular thereto.

The checklines 22 and 23, Fig. 9, have a similar function. Line 22 is indicated as under strain in this figure but the limit of bending or swinging together of the forward ends of the booms around their pivot connections with the yard is determined by stops 96 on these lines. Line 22 is shown as passing over block 97, attached to boom 13, to an eye 98 attached to boom 17.

A pair of arms 99, Fig. 5, form a pivotal connection between the forward ends of the booms. These arms allow the boom to fold together around pivot 100 and the arms 99 may also fold against the booms. Stop shoulders 101 on arms 99 limit the hinge action in one direction.

The outer ends of the yardarms fit sheave-carrying ferrules or sockets 102. These sockets carry halyard sheaves 103. Halyards attached to the center of each boom pass through the halyard sheaves and over sheaves 105 on the yard journalling pin 6, Fig. 6. From these sheaves the halyards lead down to ratchet winding drum 106, Fig. 9, and stay the mast.

The halyards are indicated on the drawings at 107. The booms carry travellers 108, Fig. 11, fitting over a jackstay 109 on the yard. The jackstay thus serves as a guide along which the booms ride upon operation of the halyards. These jackstays also regulate the limit of outward movement of the booms along the yard.

Figure 23:
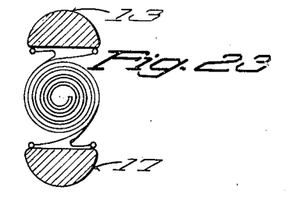
Fig. 23 is a sectional detail through port and starboard booms showing the manner in which a sail may be furled between these booms, taken on the line 23—23 of Fig. 27.
Figure 27:
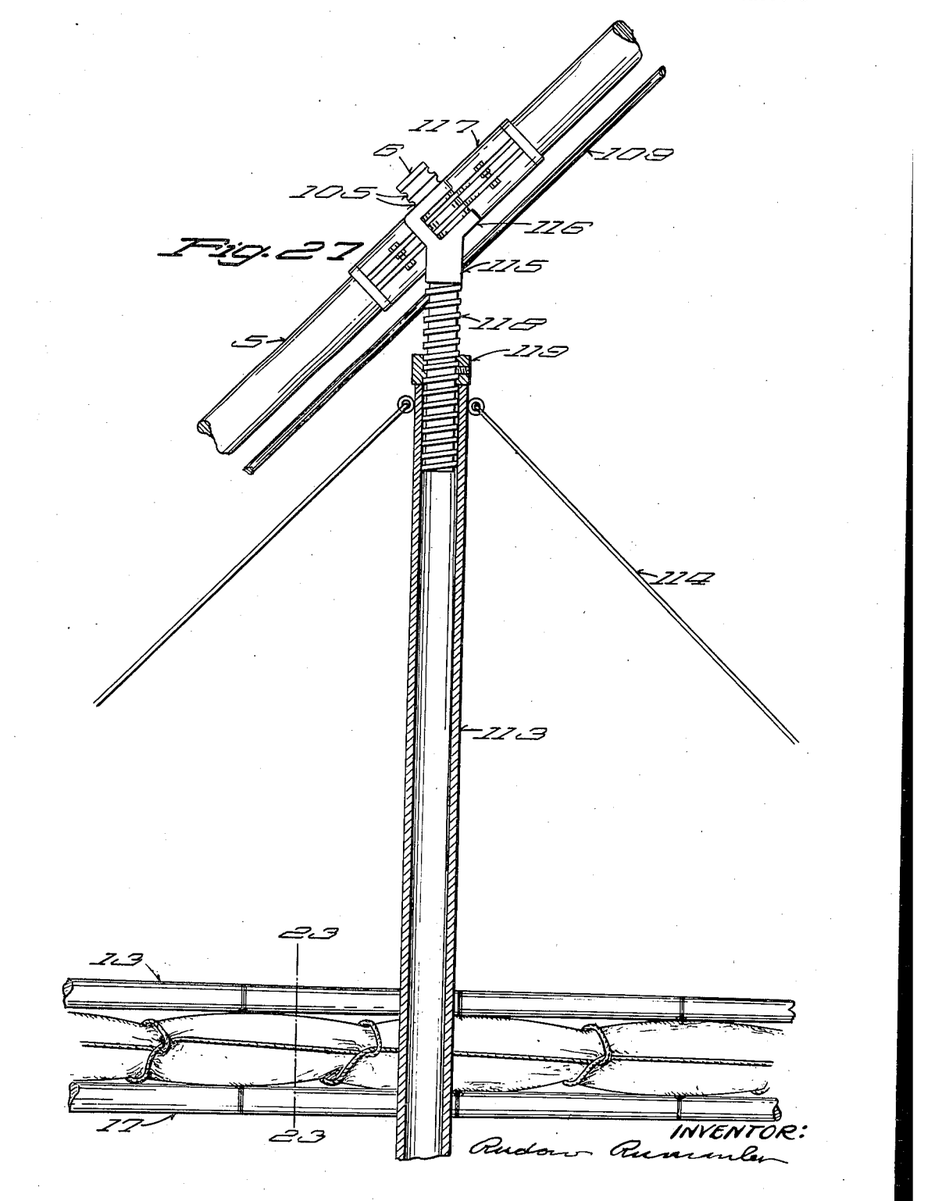
Fig. 27 is a fragmentary side view of the rig with the sail furled.

To furl the sail one of the booms, for example starboard 13 Fig. 9, is lowered to parallelism with the port boom 17, as indicated by Fig. 27. By taking hold of the sail at its center seam and rolling it together double, the sail may be quickly furled between the booms as indicated in Fig. 23 and stopped with a neat appearance.

Figure 14:
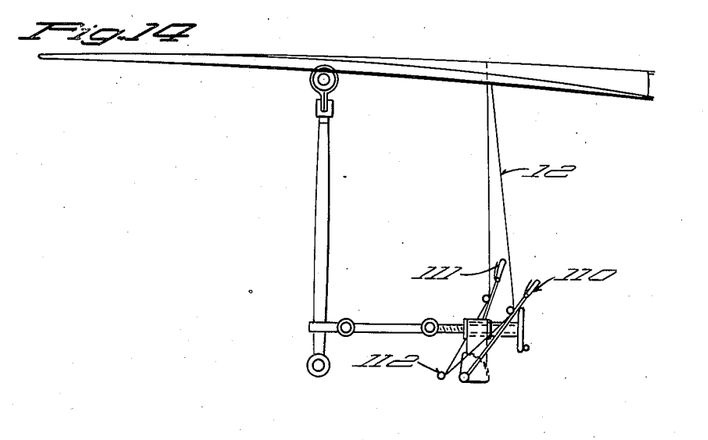
Fig. 14 is a diagram in side elevation showing an application of the rig to a power vessel with sail set at positive incidence and shiftable fore and aft.

In Fig. 14 lever means 110 and 111 is employed for sheet adjustment to take the place of the tackle arrangement illustrated by Fig. 18. In Fig. 14 the sheet leads through a fixed sheave 112 and the opposite leads of the sheet from boom to boom are under the control of levers 110 and 111 which carry sheaves through which the sheet passes. These levers are equipped with locking dogs and operating handles therefor.

Fig. 27 is included to illustrate a means for changing the effective length of a mast. In this view a hollow mast 113 is supported by stays 114, and seated in its upper end, is a masthead fitting 115 providing a diagonal bearing 116 for the yard bearing 117. The yard turns on its longitudinal axis in the bearing 117 and may swing with the bearing 117 in an oblique plane as provided by the diagonal bearing 116. In this construction masthead fitting 115 may also turn on the mast axis. The shank of fitting 115 has a square thread 118 for receiving an adjusting nut 119 resting on the top of the mast. The yard may be raised or lowered by adjustment of the nut.

A slight change in the effective length of the mast permits a relatively large change in the boom lengths and a considerable change in sail area. Having a given clearance of the booms above the deck when the sail is in vertical position on either side of the mast, and assuming that it is desired to put a larger rig on the same mast while maintaining the same deck clearance, then by raising masthead fitting 115 one foot, the boom lengths are increased four feet and a sail of correspondingly larger area may be carried.

Fig. 27 also serves to illustrate an arrangement whereby the sail may set absolutely perpendicular to the deck and in parallelism with the mast.

The tripod mast construction shown in Figure 9 serves to limit movement of the sail toward vertical by the lowermost boom coming into contact with one of the mast struts. This is a safety feature supplementing the checklines 22 and 23. A sail preferably should not set vertical in a strong wind for it then constitutes an upsetting lever. That condition is dangerous in running before the wind also, for the reason that the rig is more readily torn loose and there is the possibility of dismasting. In tacking, a strictly fore-and-aft rig is safeguarded to some extent due to the particular angular setting of the sail with reference to the wind and by leaning over far enough to spill a large part of the wind which it would otherwise receive. A close-hauled vertical sail turning on one axis moves toward a neutral position as the vessel leans; that is, the sail will ultimately be edgewise to the wind before it reaches a 90° angle from vertical. To correctly compensate for that change in setting of a sail with reference to the wind, it is essential to turn the sail on two axes to hold the course and maintain the same angularity with reference to air flow. The rig now provided has such desirable characteristic.

The lateral thrust is reduced by part conversion into an upward thrust. Windward travel is maintained, whether or not dependence is had upon the lateral resistance of a keel or the downward pull of gravity. Insofar as the vessel is lifted, its speed is increased and the rig is less likely to be torn away as is the case when a vessel is free to nose into the water.

Figure 28:
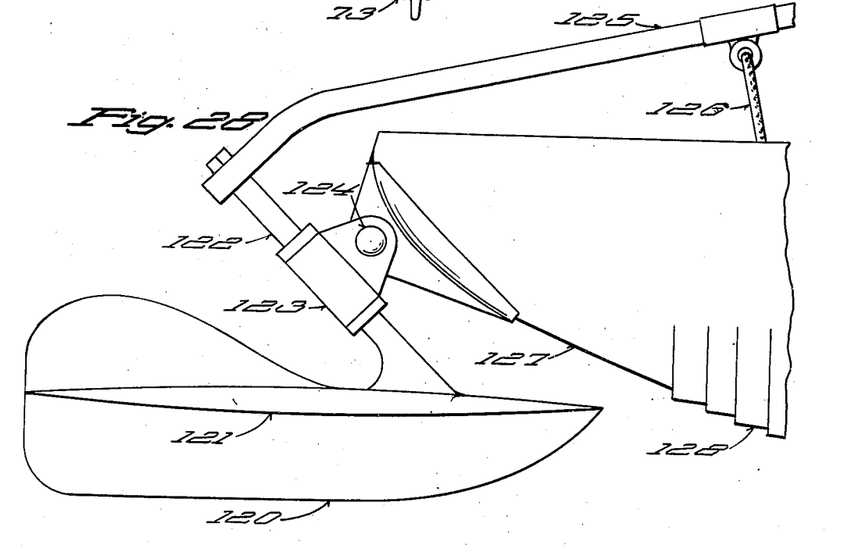
Fig. 28 is a side view of a rudder construction, with the hull, to which it is applied, partly broken away.

Figure 28 illustrates a rudder construction adapted for aiding a vessel to nose up or to check speed. The vertical fin 120 of the rudder is supplemented by a horizontal fin 121. Rudder post 122 is journaled in a bearing 123, which bearing is pivoted to the hull by a horizontal shaft 124.

By swinging the tiller 125 laterally, the vessel is steered to right or left but to aid in lifting the nose of the craft the tiller may be depressed around shaft 124. Tackle 126 may be used for such purpose and also serves to limit oscillation of the nose of the rudder toward the hull.

The stern of hull 127 is shown as Clinker-built at 128, with the strakes running transversely to provide steps and to let air in where the hull pulls a stern wave.

Figure 29:
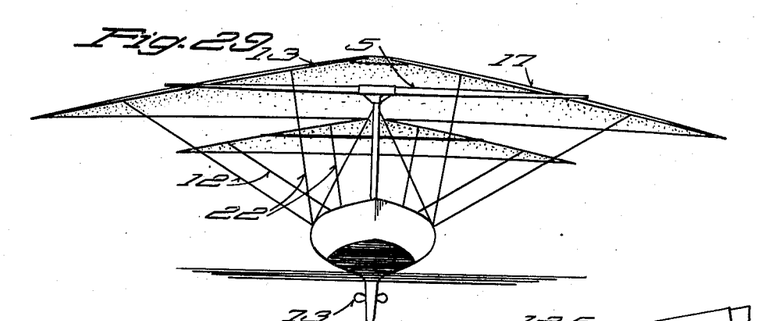
Fig. 29 is a front view of a power vessel with wings or sails set at positive incidence.

Figure 29 shows that the sails may be set at positive incidence to cooperate with engine power for causing a vessel to plane upwardly in the water and become air-cushioned. The positive incidence is exaggerated in this view, as would appear when looking somewhat upwardly at the sails. When the sail is horizontal the leading edge is, as long as the leech, and when the sail is vertical it has a leading edge about the length of the boom.

Figure 30:
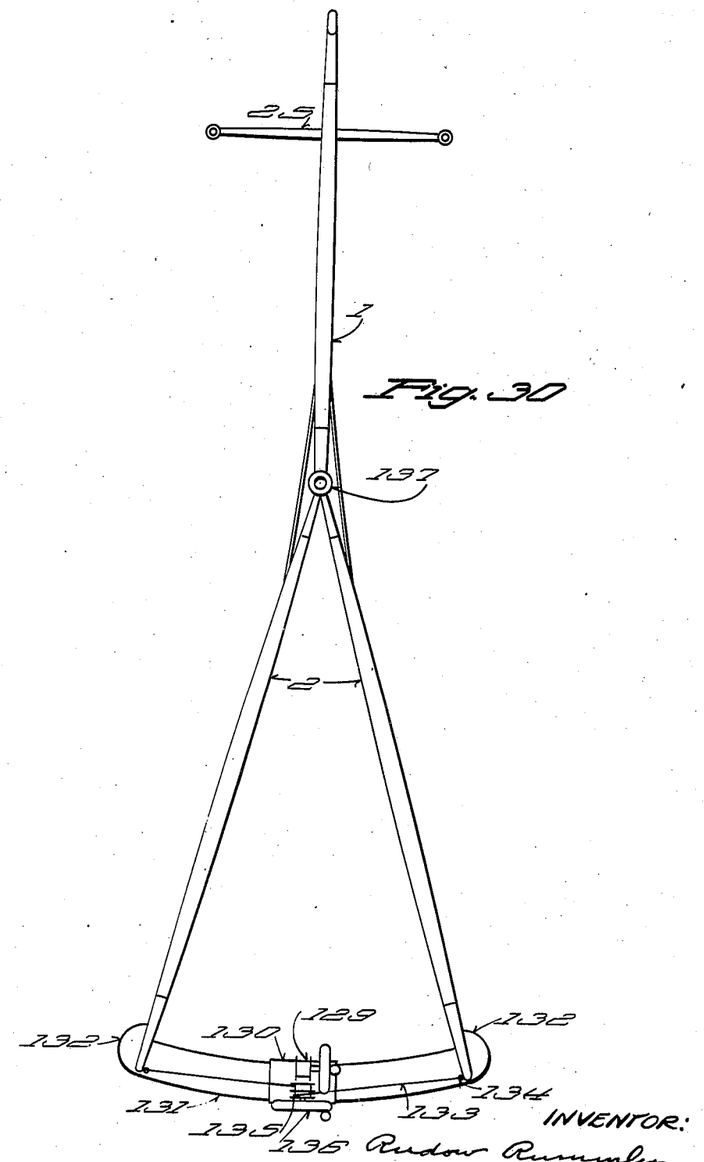
Fig. 30 is a plan view of a tripod mast including an arcuate track for a laterally shiftable sheet control unit.

Provision for lateral stability is illustrated by Figure 30. The sheet-winding drum indicated by 129 is mounted upon a base 130 which is flanged around an arcuate track 131 extending between the base pads 132 for rearwardly extending mast struts 2. The cables 133 extend from anchoring points 134 at the lower ends of the struts to a double-winding drum 135 operated by wheel 136. The cables are wound oppositely around drum 135 so that when the drum is turned, one cable winds and the other cable unwinds. Thus the sheet-control unit 129 is shifted to right or left and through the sheets swings the sail around the masthead yard bearing 137. The center of area of the sail is rearward of the mast.

The lateral shift is taken care of without the special provision provided by the construction of Figure 30. It may occur with the equipment illustrated by Fig. 27. By placing the sheet connections to the boom aft toward the clew ends, as in Fig. 33, the sheets then extend inwardly in a forward direction to the winding drums when the sail is horizontal. That arrangement, in connection with the vertical center axis for the yard and the particular placing of the forward checklines, allows for rotation of the sail in its plane, preliminary to lateral cant of the sail. By taking up on a sheet at one side, the boom to which it is connected swings forward around the mast, the front end of the boom moving to weather on a new tack and the center of area of the sail moving over toward the lee.

Figure 31:
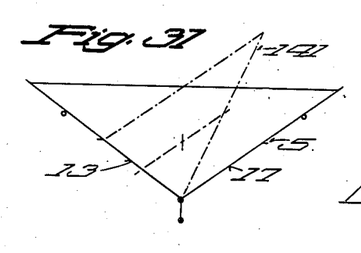
Figs. 31 and 32 are respectively front and side view outlines of a sail mounted for adjustment around a forty-five degree axis.
Figure 32:
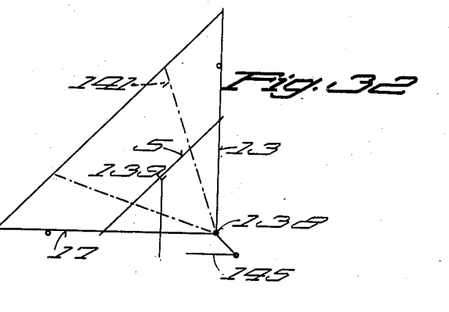

Figures 31 and 32 show that a sail mounted for adjustment around two axes only will provide for all correct and needed positions of a sail on any course with reference to the wind. Such a construction has all of the desirable characteristics of a square sail and a strictly fore-and-aft sail. This end is attained by means of a yard bearing on a 45° axis in connection with a yard that may turn on its longitudinal axis.

Figure 32 shows the sail vertical, edgewise to the wind, starboard boom 13 representing the leading edge. The meeting point 138 of the booms is held in line with the 45° axis at masthead 139 by tackle 140. By canting the sail slightly on this axis, the sail sets close-hauled. By moving it further, as indicated by the dot and dash lines 141, the sail is set for reaching and then by moving it still further to the full line position, shown by Fig. 31, the sail is set for running. It then receives approximately as much lift as horizontal thrust. The sail is capable of more effective driving at such 45° setting than it could have in a vertical position, when the wind is of sufficient strength to harmonize with the weight of the craft.

Figures 33, 34:
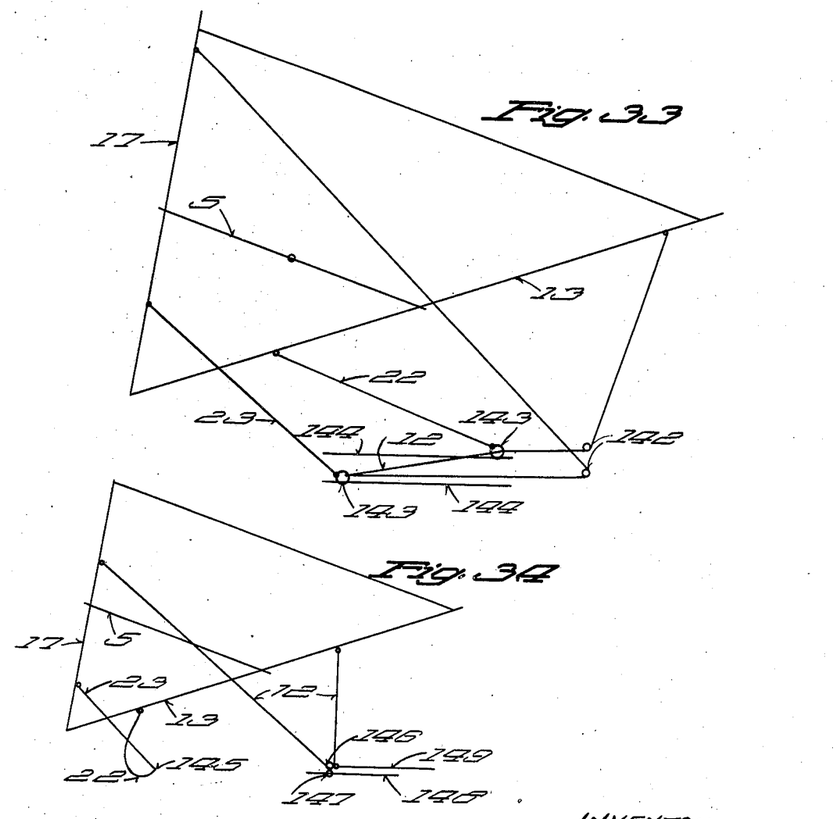
Figs. 33 and 34 are diagrams showing compensating travellers for control lines or sheets.

Figure 33 shows an arrangement of sail control lines not necessarily requiring winding drums and to provide for compensation between the checklines 22 and 23 and the sheet 12. Sheet 12 is the only line operated for the purpose of controlling the angular setting of the sail. As it is hauled in on one side, it pays out on the other. The sheet passes through deck fair-leaders 142 and through travelers 143, riding on horses or tracks 144. Check-lines 22 and 23 are attached to the travelers. By directing the vessel ahead of the wind, the sail is swung as far as the sheet will permit, moving the travelers aft and tensioning both checklines 22 and 23.

With the checklines anchored to the deck at 145, as in Fig. 34, both checklines 22 and 23 become slack when running before the wind and one only, the weather one, is tensioned as the sail shifts toward the close-haul position. In this diagram, the sheet 12 passes around a block 146 carried by traveler 147 on track 148. The sail is lifted to a running position by releasing line 149 leading back to a cleat.

All cleating may be avoided by using an arrangement such as shown in Fig. 17. Fig. 17 shows a pair of sheet-control wheels 150 and 151 providing leverage, as the winding drums 152 and 153, to which these wheels are respectively fast, are of less diameter than the wheels. If one wheel is turned, the other wheel will turn in an opposite direction, due to the differential gear connection 154. If both wheels are pulled down to the right, both leads of the sheet are wound up and the sail is drawn down against the wind. Unwinding is prevented by ratchet 155 fast to the supporting shaft which carries the pinion spider. By releasing the ratchet, which may be like that shown in Fig. 2, the sheet pays out.

Figure 15:
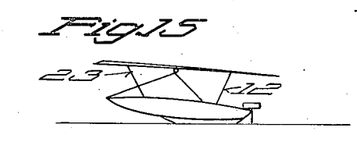
Fig. 15 is a diagram showing a small outboard motorboat with sail at positive incidence.
Figure 16:
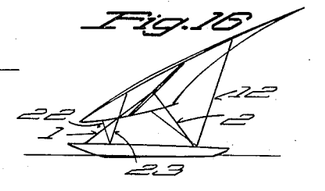
Fig. 16 is a diagram of a sailboat with the sails set for windward work and what is meant in this specification as negative incidence.

Figure 17 includes a worm-operated drum 156 for checklines 22 and 23 and provides for quick adjustment of these lines from, for example, sailing with negative incidence of the sail or operating under power with positive incidence, as illustrated in Figure 15.

In the production of a practical rig to comply with what is considered normal sailing in combination with soaring, and with a possible gradual conversion to predominance of one action over the other according to the available air velocity, the construction required is both for suspension of a sail from a mast and in turn, suspension of the hull from the sail. The suspension means shown is of spider form including the sheets, checklines and the mast. A sail or air foil of substantially right-triangular outline meets minimum space requirements for the compound movements required of the sail. The sail has universal weather-vane action being free to set vertically or horizontally and shift from a vertical setting on one side to a vertical setting on the opposite side. The forward apex of the triangle rises as the sail moves toward horizontal and then dips as the sail again comes back to a vertical position. Further provision is made for a limited rotation of the sail in its own plane when setting horizontal for the purpose of maintaining lateral stability.

Operation

Because of the location of the center of area of the sail, there is a tendency for the sail to assume a neutral horizontal position or set more or less vertically with the major area in back of the mast. The center of sail area is preferably located with reference to the center of lateral resistance of the hull, as customary with fore and aft rigs, to cause the vessel to head into the wind when the wheel is let go. Without wind to hold it up the sail falls toward horizontal as far as the checklines will let it go.

Restraining means automatically limit all motions of the sail and the sail is always either swung outwardly to operative position by the wind, as normal in sailing vessels, or is lifted by the wind into a soaring position or is positioned for a combination of sailing and soaring. The extent of outward and upward swing of the sail is controlled by permitting a sheet, extending to both sides of the sail, to pay out as required. Thus the setting of the sail for a particular course is dependent upon how much freedom is given the sail by paying out the sheet on two sides. The same sheet controls rotation of the sail from vertical to horizontal and back to vertical position by means of a differential winding drum, whereby the sheet may be paid out on one side and hauled in on the other side, or both leads of the sheet are hauled down when the leech of the sail is above the mast, or hauled in when the leech of the sail is off to one side of the vessel.

The sail's overhead rotation is used to change tack. Such rotation is a variable compound action mainly on a central fore-and-aft axis with a coincident fore-and-aft dip and sometimes is accompanied by a partial rotation of the sail in its plane.

The soaring tactics of birds and the anatomical characteristics thereof provide useful information for improvements in the arts of sailing and rigging of vessels. Conspicuous differences between a soaring bird and sailing vessels, as commonly rigged, is that the wing structure of the bird is more horizontally extended and with angularly related surfaces facilitating change of tack with a minimum change of course while that of the ship has a vertical setting. The bird's wings receive a sustaining thrust on all courses, whereas in a ship's rig, a lifting force is made use of at times with some sails when running before the wind, but not on other courses. For example, in a fore-and-aft rigged vessel head sails are commonly run up on forestays, which are inclined from the stem of the vessel to the mast. Thus, in running before the wind there is some lift, but generally not of high value because of the customary minor degree of inclination of the stays. When the sails are shifted toward the close hauled position and the vessel heels, the wind has the effect of delivering a downward component in its thrust, and hence causes the vessel to needlessly labor at reduced speed from what it might have if this detrimental component were utilized for lift and reduction of displacement and rendering gravity effective for forward propulsion. All that is required to overcome that deficiency in old rigs is to substitute therefor a construction and mode of operation more nearly approximating that of natural wing forms and action.

The invention is directed to improvements in the art of effecting windward work and to utilizing horizontal inclination plus gravity for driving on all courses. The apparent sailing of birds to windward has generally been accounted for by their facility for making use of upward drafts of air, which is obviously a fact under some conditions where there is proof of an upward draft, such as a sea breeze passing upwardly over shore cliffs. The art of sailplane soaring has been developed mainly due to a recognition and use of such upward drafts. These upward drafts are known to be caused by other than topographical contours; for example, varying radiating capacities of the earth's surface as between a desert and a forest.

From applicant's observation, horizontal currents are amply sufficient for windward work of high efficiency, provided the wing sets at negative incidence and there is sufficient weight and appropriate form and wing area consistent with wind velocity. A bird of correct weight for working against a wind of twenty miles per hour, upon a lightening of the breeze, presumably finds a critical condition where it can no longer soar against the wind, and also finds a critical point upon strengthening of the wind, rendering impossible further windward work. The bird's wing surfaces and body are in such angular relationship as to present to the wind tacking surfaces, useful for either port or starboard tacks by a few degrees of change of course. Change of tack is effected without loss of sustaining wind and with use of momentum inertia. With normal soaring there is probably a slight shift of the center of effort to the lee side upon a change of tack, at least this is an apparent fact with the partial imitation herein disclosed. Soaring birds with a dihedral setting of their wings evidence a windward position of the center of effort and a lack of stability.

This rig is designed for use in imitating to some degree the art of tacking, which applicant believes is performed by some birds, but with differences; the sail may work with a vertical setting, the sail has a partial rotation in its own plane while performing a compound tilting action, the boat while sailing is normally sustained by water except for lift from the wind, and has the addition of lateral resistance of immersed fins and a hull, and has an engine enabling an artificially effected increase in wind velocity by use of mechanical power in driving the vessel along the surface of the water.

Structurally, this rigging is of such a nature that it may be manufactured complete in working order, independently of the hulls to which it is applied, or may be made so that the component parts are built in or secured to the hull structure or framing. When built on the hull, the mast may be stepped as usual with permanent stays and shrouds, but the mast height is reduced one-half to two-thirds and even three-fourths of that customary in rigging with equal sail area. When the rig is manufactured independently of the hull, it has an open base made to rest upon the deck, fitting within or clamped to the rail of the hull to which it is to be applied. A tripod mast is convenient for that set-up, and the struts thereof, which with the rig at rest take weight compression, are anchored to the base and include tension arrangements to properly resist stresses in all directions.

The booms are pivotally connected together at their forward ends. This pivotal connection is made between clevices clamped around the forward ends of the booms, and links are pivoted to the clevises at one end and together at their opposite ends. The purpose of the link connection between the forward ends of the booms is to provide an automatic means for controlling the air foiling of the sail. The minimum fullness of the luff of the sail is regulated by check cables from the pivotal connection of the links to a collar on each boom. This collar may be fixed or permitted to slide slightly between stops on the boom. The collar has an eye having a turnbuckle connection with a jackstay for the boom. This jackstay serves to strengthen the boom against excessive inward bending by the strain of the sheets.

The details of construction mentioned in the preceding paragraph, in connection with a yard for spreading the booms, have an effect on operation in several respects. A sail made perfectly flat without allowance for curvature to give it form naturally assumes a substantially correct form. The booms set in the same plane irrespective of the angular position of the sail with reference to the mast. The construction is distinguishable in action from a sail supported by a gaff wherein the gaff usually sets at a different angle than the foot or boom end of the sail.

A Marconi sail also warps more or less with the peak portion of the sail setting at a different angle than the foot, and the tapered peak constitutes a useless drag through the air.

Another distinction between the improved rig and a gaff arrangement is that the former is balanced both statically and dynamically and may have a relatively lowered center of effort with equal area.

The use of mechanical propulsion means in connection with this sail for supplementing the effective velocity and direction of the wind when sailing is for increasing speed by assisting in reducing displacement. Under calm conditions, when power is relied upon exclusively, the sail, aside from being used for banking on turns, merely functions the same as the wings of a seaplane when taking off and is of value for increasing speed only in so far as windage may offer less resistance than would result from the added displacement without the use of the sail. The propeller, however, has traction in a medium having seven or eight hundred times more density than the air acted upon by the propeller of a seaplane. While some of the illustrations show the sail at positive incidence, the intended normal setting of the sail on most courses and with the assistance of a working engine, is at negative incidence; that is, the entering nose of the sail is low and the leech end high with reference to the deck line. Expressed otherwise, the sail is at an angle of declination and in tacking must also be canted laterally. Thus, if the craft were dropped through still air, it would plane down forwardly and to one side.

I claim:

1. A triangular sail, supporting spars on two sides of said sail, a yard connecting the two spars, pivot fittings between the ends of the yard and the spars, said fittings being connected with the yard for axial adjustment with respect thereto, and means for shifting said pivot fittings on the yard to vary the spacing between the spars.

2. A sail of substantially triangular form having spars disposed along two sides and a transverse yard connecting said spars and disposed between the center of area of said sail and the converging ends of said spars, a fixed mast for supporting the sail, a bearing for the yard at the top of the mast and midway between two sides of the sail in line with the vertex of the triangle, said vertex constituting the forward end of the sail, and the axis of said bearing being forwardly declined substantially forty-five degrees from horizontal, means pivotally securing said yard on said bearing, and means for rocking the sail laterally on the declined yard bearing to alternate said two sides of the sail between vertical and horizontal positions.

3. A sail of substantially triangular form having spars disposed along two sides and a transverse yard connecting said spars and disposed between the center of area of said sail and the converging ends of said spars, a fixed mast for supporting the sail, a bearing for the yard at the top of the mast and midway between two sides of the sail in line with the vertex of the triangle, said vertex constituting the forward end of the sail, and the axis of said bearing being forwardly declined substantially forty-five degrees from horizontal, means pivotally securing said yard on said bearing, and means on said yard providing an axis of rotation for the sail perpendicular to the forty-five degree axis.

RUDOW RUMMLER.